United States Patent [19]

Miller et al.

[11] Patent Number: 5,135,115
[45] Date of Patent: Aug. 4, 1992

[54] DOCUMENT SORTER AND STACKER, PARTICULARLY FOR DOCUMENT PROCESSORS

[75] Inventors: John P. Miller, Irving; Thomas J. Norman, Jr., Richardson; Ronald E. Robins, Plano, all of Tex.

[73] Assignee: BancTec, Inc., Dallas, Tex.

[21] Appl. No.: 233,145

[22] Filed: Aug. 17, 1988

[51] Int. Cl.⁵ .................... B07C 5/36; B65H 29/22
[52] U.S. Cl. .................... 209/564; 209/583; 209/654; 209/657; 271/187; 271/305; 271/315
[58] Field of Search ................ 209/563-566, 209/569, 583, 651-654, 656, 657; 271/178, 187, 303, 305, 315

[56] References Cited

U.S. PATENT DOCUMENTS

| | | | |
|---|---|---|---|
| 3,075,760 | 1/1963 | Frederick | 271/187 |
| 3,162,439 | 12/1964 | Poland et al. | 271/303 X |
| 3,531,108 | 9/1970 | Rabinow et al. | 271/305 |
| 3,749,239 | 7/1973 | Holdway et al. | 209/583 |
| 3,968,960 | 7/1976 | Fedor et al. | 271/187 |
| 4,088,314 | 5/1978 | Phillips | 271/187 X |
| 4,124,121 | 11/1978 | Sung et al. | 209/583 |
| 4,251,000 | 2/1981 | Templeton | 209/566 X |

FOREIGN PATENT DOCUMENTS

| | | | |
|---|---|---|---|
| 61-221036 | 10/1986 | Japan | 271/315 |
| 2059391 | 4/1981 | United Kingdom | 271/315 |

Primary Examiner—Michael S. Huppert
Assistant Examiner—Edward M. Wacyra
Attorney, Agent, or Firm—Kenneth R. Glaser

[57] ABSTRACT

A document sorter/stacker apparatus includes a plurality of slotted disk assemblies respectively associated with bins or pockets in which high-speed transported documents are to be sorted and stacked. Each of the disk assemblies is selectively rotated to position its document capture slot either into or out of the transport path documents, thereby to enable either the routing of the document through that particular pocket or its passage to another pocket. When the leading end of a document is captured within the slot, the slotted disk assembly is rotated to feed the document into the corresponding pocket. The rim of the slotted disk assembly is in contact with a document transport belt and with an endless belt driven by the slotted disk assembly to urge the document into the pocket. After the document has been fed into the pocket, the endless belt urges the tail end of the document away from the slotted disk assembly and toward a backing plate where the documents are accumulated in a stacked configuration.

8 Claims, 8 Drawing Sheets

DOCUMENT SORTER AND STACKER, PARTICULARLY FOR DOCUMENT PROCESSORS

The present invention relates generally to document sorting and stacking, more particularly to high-speed document sorter and stacker equipment, and even more particularly to document processing systems having high-speed sorting and stacking capability.

It is well known that the proliferation of commercial documents have required the development of high-speed document processing systems to automatically process various types of such documents, and particularly the information and data thereupon. For example, one class of document processing systems are computerized remittance processors for automatically processing payment and payment record documents and their data. Additionally, document processors are utilized by banks and other financial institutions for processing checks and deposits, the funds transfer data represented thereby, and for generating monthly customer statements.

Significant advances have been made in the reliability and efficiency of these document processing systems with highly sophisticated technological advances being made which enhance the speed by which the data associated with such documents is processed. However, the full and effective use of these type systems require that the output apparatus for sorting and stacking the documents after processing also have compatible reliability and speed, and prior to the development of the present invention, existing document sorter and stacking equipment has not been entirely satisfactory for all conditions of service.

It is therefore a principal object of the present invention to provide a new and improved method and apparatus for document sorting and stacking.

It is another object of the present invention to provide a new and improved high-speed document sorter/stacker apparatus which achieves significantly greater system performance, reduces the probability of document jams, and which is capable of simultaneously sorting and stacking various sizes and types of documents in an effective and efficient manner.

It is a still further object of the present invention to provide the aforementioned document sorter/stacker for incorporation with financial document processors.

In accordance with these and other objects, the present invention is directed to a sorter/stacker mechanism of the type having a plurality of slotted disc assemblies respectively associated with bins or pockets in which high-speed transported documents are to be sorted and stacked, each of the disc assemblies being selectively rotated to position its document capture slot either into or out of the transport path of the documents, thereby to enable either the routing of the document to that particular pocket or its passage to another pocket. Furthermore, each rotating slotted disc assembly is effective to not only capture desired documents for its particular pocket, but also to uniquely position and stack the so-captured documents in such pocket.

In accordance with specific features of the invention, the selective rotation of each of the slotted disc assemblies are under the computer control of a stored program controller which effects identification of the predetermined type of documents to be stored in each pocket and transmits the required instructions to selectively rotate particular disc assemblies in recognition of that document approaching the desired pocket. Furthermore, the sorter/stacker mechanism is assembled in a manner which allows sets of stacking pockets to be modularly increased, depending upon the overall needs of the associated document processing equipment.

Accordingly, the sorter and stacker mechanism is effective, among other advantages, to selectively sort and stack documents of a particular predetermined type, irrespective of their size or shape, in one particular pocket or bin, with the slotted disc assembly providing both functions of sorting (capture) and stacking.

Additional and specific features of the invention, as well as additional objects and advantages thereof, will become more readily understood by reference to the following detailed description taken in conjunction with the accompanying drawings, in which.

Figure 1:
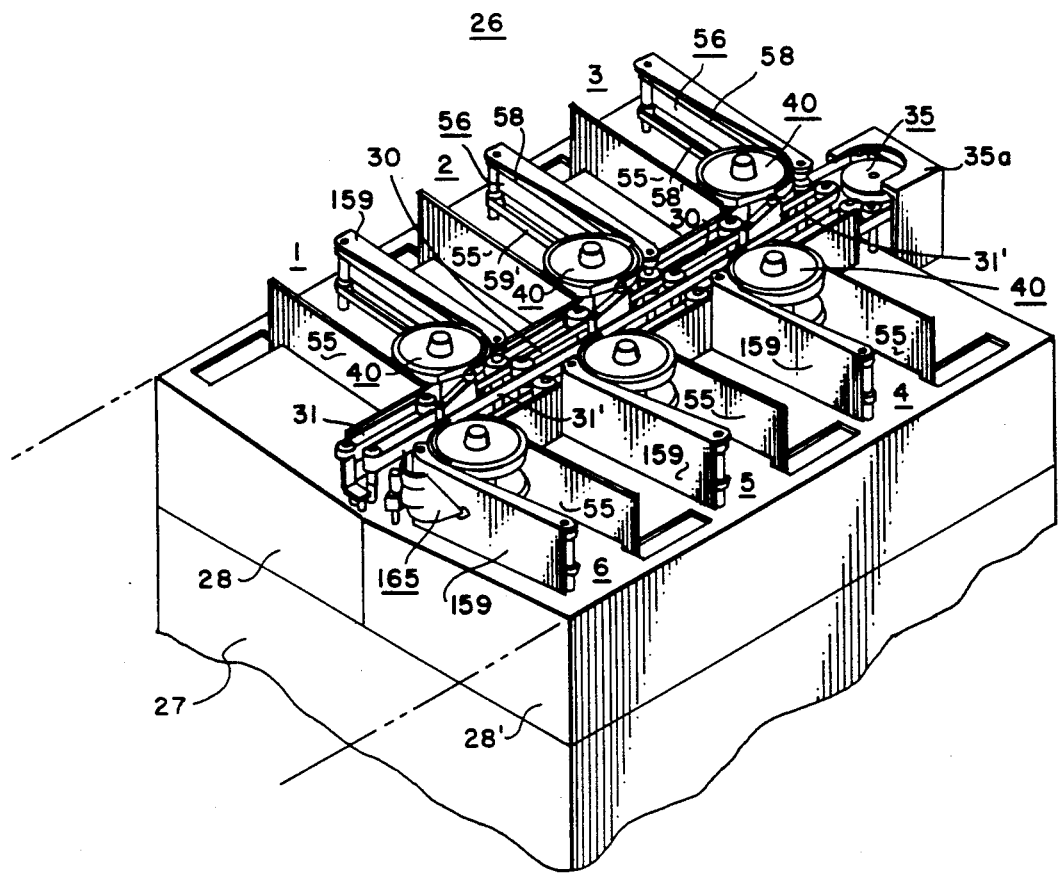
FIG. 1 is a top, partial perspective view of the document sorter/stacker of the present invention.

The drawings are not necessarily to scale, and in some instances portions have been exaggerated in order to emphasize particular features of the invention.

The improved sorter/document stacker of the present invention is, in a preferred embodiment, incorporated in an overall document processing system. The document processing system is of the type for processing financial transaction documents, as well as the information and data thereupon, for purposes such as remittance processing, for example. As used throughout the following description and claims, the term "financial transaction document" means and refers to documents having application to transfer of funds, record of payments, etc. and would include, for example, checks, money orders, and bank deposit slips, as well as remittance stubs of the type accompanying monthly payments. In addition, while the document stacker of the present invention is described herein for sorting and stacking financial transaction documents, it is to be understood that the stacker is equally useful for sorting and stacking any type of documents.

Accordingly, the document processing system has a desk-type configuration comprising a plurality of work station modules through which the financial transaction documents are sequentially transported. In the document processing system, the work station modules would include, proceeding in the order of sequence of document transport, a feed station; a document read station; an operator viewing station; a document encoding station; an endorsing and audit trail print station; a microfilming station; and an output stacking station, at which the stacker assembly of the present invention is disposed.

In accordance with the overall operation of the document processing system, the financial transaction documents (checks, remittance advice stubs, deposit slips, etc.) are inputted, either automatically, by way of an automatic document feeder disposed at a substation, or manually at a substation, the documents thereafter being advanced through the various work stations by a high-speed document transport assembly (not shown) comprising, for example, a plurality of endless friction belts driven driver and idler wheels or rollers disposed along an L-shaped open track transport passageway, all as presently known in the art.

Specifically, the documents are transported initially to the document reading station where a document reader assembly, typically including both optical character recognition (OCR) and magnetic ink character recognition (MICR) read heads, is effective to detect and read both human readable and machine readable information on the face of the documents. The documents are thereafter transported to an operator viewing station where a human operator visually inspects the transported documents and, with the use and assistance of the terminal keyboard and CRT display, key entry inputs additional data and appropriate system instructions. The operator viewing station, if desired, may be of the multiple view station type disclosed in U.S. Pat. No. 4,722,444, issued Feb. 2, 1988, and assigned to the assignee of the present invention.

The documents, after leaving the operator viewing station, are then advanced to document encoding station where a document encoder, of known and conventional construction, is effective to imprint machine-readable, usually MICR, data on the face of the transported documents; and thereafter to an endorsing and audit trail print station where, particularly in the case of checks, appropriate data is endorsed and imprinted on the front or back of the documents. The documents are thereafter transmitted to a microfilming station, where each document is microfilmed for archival purposes, and/or to an optical image processing station (not shown) where images of the transported documents can be processed, all as is conventionally known in the art. The so-processed documents are thereafter transported to a stacking work station for selective sorting and stacking, at which the unique document stacker assembly of the present invention is located, the details and operation of which are subsequently described. All of the aforementioned operations and transport are under the control, for example, of a central processor unit and the program software resident therein.

In accordance with the present invention, disposed at the stacking work station is one or more stacker modules, each module having a multi-pocket stacker mechanism 26 (FIG. 1) supported upon a cabinet housing 27. Each stacker mechanism 26 defines a plurality of pockets or bins into which documents exiting the microfilming station, for example, are selectively routed by the various assemblies, and in the manner, subsequently described. Thus, in the preferred embodiment depicted in FIG. 1, stacker mechanism 26 defines six such pockets (labelled as 1, 2, 3, 4, 5, and 6), and by operatively coupling the stacker modules, it is readily seen that the total number of stacker pockets can be modularly increased by adding additional stacker modules.

In accordance with a preferred embodiment of the invention, each stacker mechanism 26 comprises a pair of stacker sub-assemblies 28 and 28' facing one another and disposed adjacent, but on opposite sides of, a document transport passageway 30, thereby positioning one-half of the total stacker pockets of a stacker mechanism 26 on each side of the document transport passageway 30. A power-driven transport belt assembly 31, the details and operation of which are subsequently described, is associated with stacker sub-assembly 28 and is generally aligned with the overall L-shaped transport passageway of the document processor so that documents exiting the document processor are adapted for sequential transport past the entranceway to pockets 1, 2, and 3. In similar manner, a power-driven transport belt assembly 31' (FIG. 1) is associated with stacker sub-assembly 28' and is adapted to sequentially transport documents past pockets 4, 5, and 6.

In accordance with a feature of the invention, a separate document turn assembly 35 (disposed within housing 35a), the details and operation of which being subsequently described, is associated with the last or furthest downstream stacker module (or in the case of a single module, at the terminus thereof) and is effective to reverse the direction of documents transported past pocket 3 so as to be transported towards pocket 4 (and pockets 5 and 6) of sub-assembly 28'.

At the heart of the stacker mechanism, and disposed at the entranceway of each stacker pocket, is a slotted disc assembly 40, the details and operation of which being subsequently described, effective to selectively capture a document being advanced along the passageway 30 and position the so-captured document within the associated pocket. Accordingly, each slotted disc assembly comprises (FIGS. 2 and 10) an upper disc 41 and lower disc 42 rigidly connected to a central shaft 43 passing through a top mounting plate 33 of the cabinet housing 27. The shaft 43 is connected to a conventional stepping motor 44 which rotates the shaft 43 (and hence the entire disc assembly 40) in the counter-clockwise direction of arrow 39 (FIG. 10).

Figure 10:
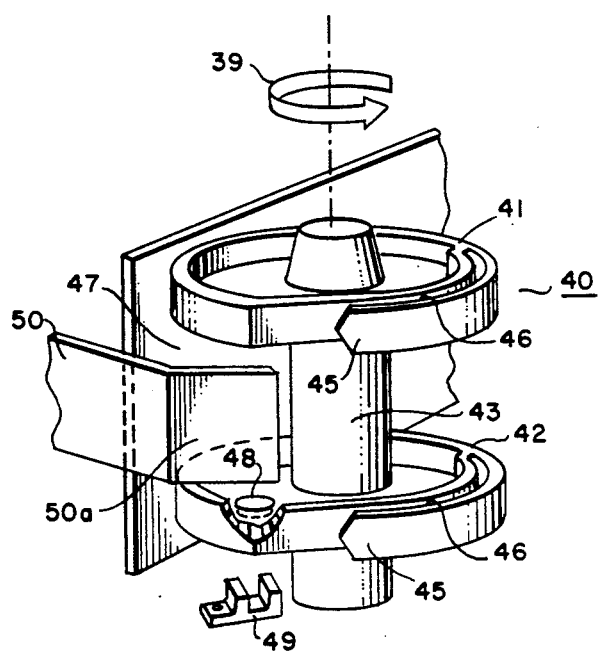
FIG. 10 is a partial perspective illustration of a slotted disc assembly.

As best seen in FIG. 10, the upper disc 41 and lower disc 42 each includes a finger portion 45 defining a document capture slot 46, the finger portion 45 and slot 46 of upper disc 41 being vertically aligned with the corresponding finger portion 45 and document capture slot 46 of lower disc 42. In accordance with a unique feature of the invention, the slotted disc assembly is so mounted at the entranceway to each pocket that when the disc assembly is appropriately rotated, the open slots 46 pass into alignment with the transport path of the documents being advanced past such pocket (FIG. 3), thereby enabling the documents to be captured within the so-defined slots. In addition, and for the purpose subsequently described, the upper and lower discs 41 and 42 are sufficiently vertically spaced on shaft 43 to enable a document stop plate 50 (having document retention bend 50a) to laterally extend into the gap 47 between the discs 41 and 42.

Figure 2:
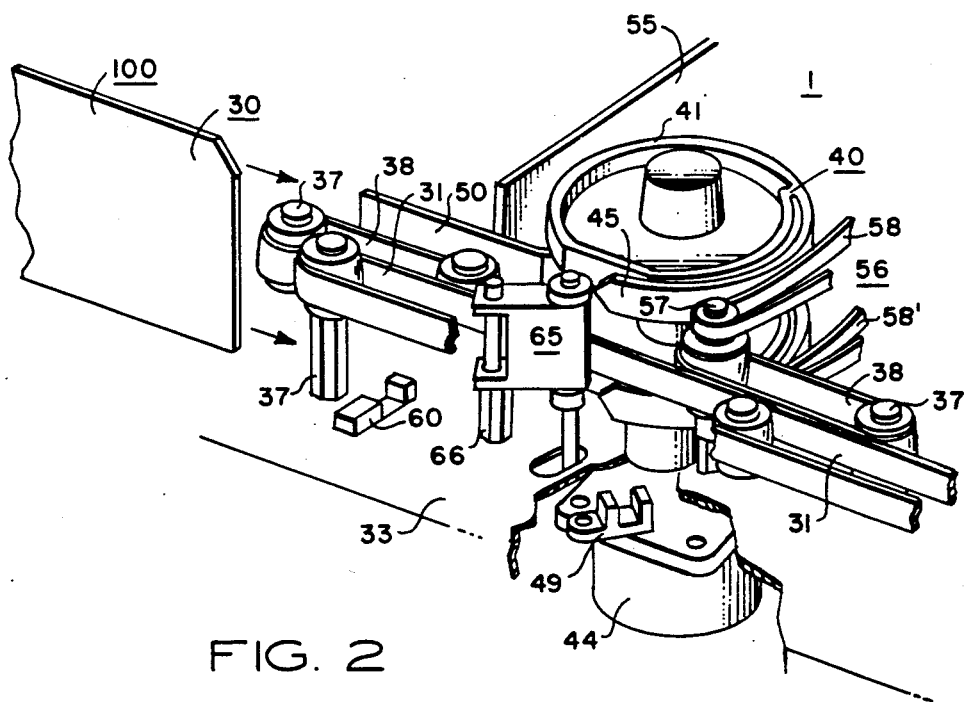
FIG. 2 is an illustration of the portion of the mechanism depicted in FIG. 1, emphasizing one slotted disc assembly and pocket.

The transport belt assembly (31 or 31') respectively associated with each stacker sub-assembly (28, 28') comprises conventional power-driven and idler pulleys 37 and associated transport belts 38 rotating in an appropriate direction to advance documents past the respective pockets. For convenience, the assembly which is depicted in FIG. 2 is the portion of the transport belt assembly 31 for advancing the entering documents past pocket 1, but it is to be understood that the illustration of FIG. 2 could equally be applicable to the transport assembly 31' transporting documents exiting the document turn assembly 35 past pocket 4.

Figure 3:
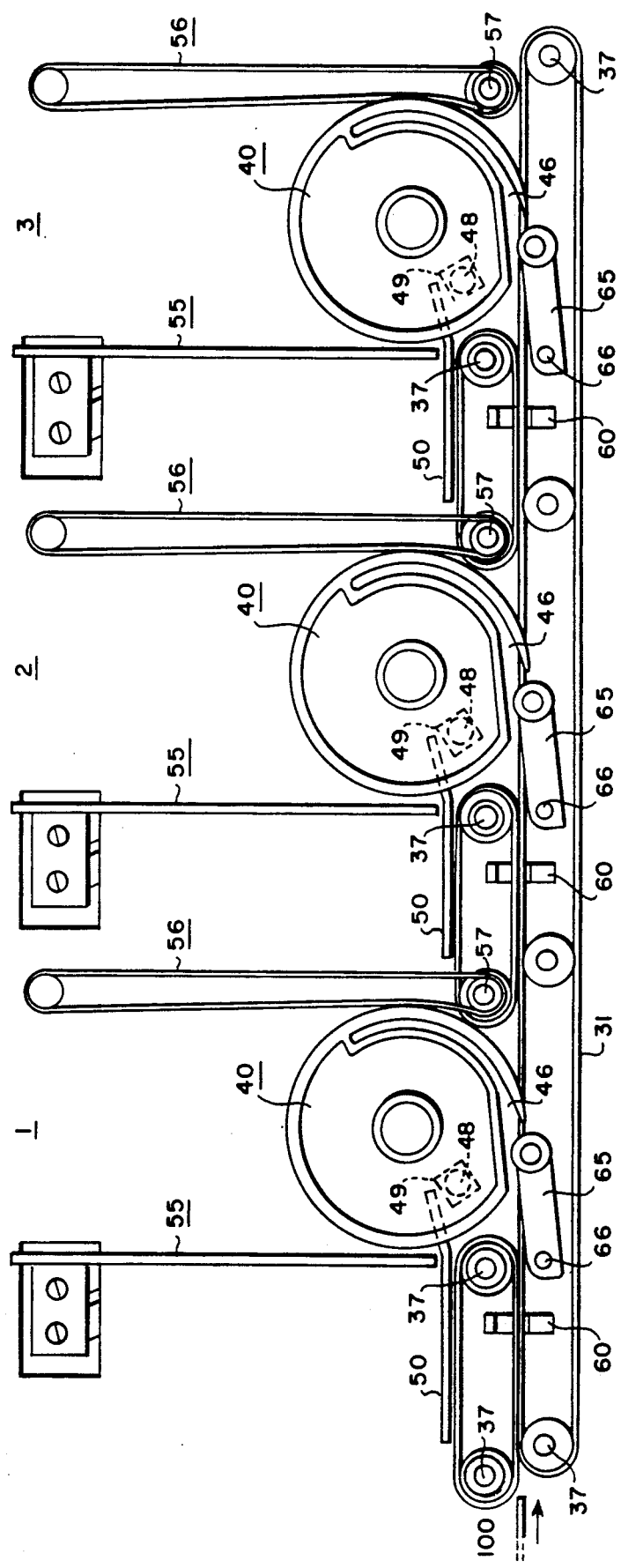
FIGS. 3-7 represent simplified illustrations, partially schematic, illustrating the sequence of operation of the sorter/stacker of the present invention.

Each slotted disc assembly 40 is normally maintained in a stationary rotary "home" position in which the entrance of each slot 46 is aligned with the document transport path (position shown in FIG. 3). Depending upon in which bin or pocket the particular document is to be stacked, and under the direction of the electronic controls, selected ones of the stepping motors 44 are then actuated to incrementally rotate the particular disc assembly (or assemblies) one full revolution. For this purpose, a permanent magnet 48 (FIG. 10) is mounted within the lower disc 42, and a magnetic sensor 49, for example a Hall effect transducer, is mounted below the disc 42 and so positioned to be within the magnetic field of the permanent magnet 48 when the disc assembly is in its rotary home position. Thus, as the slotted disc assembly 40 is rotated by the stepping motor 44, the full revolution of such assembly repositions the magnet 48 in its starting or home position, thus activating the sensor 49 and, through the resulting signal to the electronic controls, deactivates the stepping motor 44.

Figure 6:
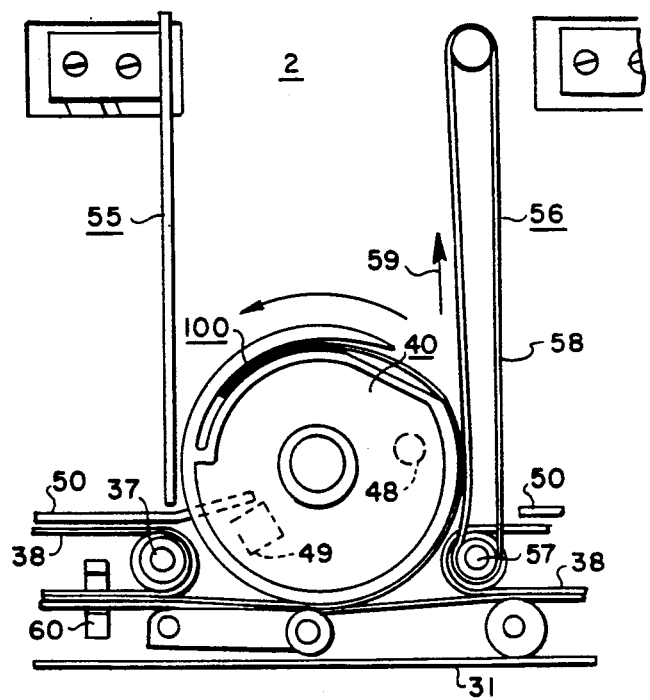

The side walls of each pocket are, in effect, defined by a document backing plate 55 and an idler belt assembly 56. Each idler belt assembly 56 comprises a pair of idler rollers 57 and upper and lower endless belts 58 and 58' (FIGS. 1 and 2) disposed around the rollers 57. Cowling plates 159 are provided to protect assemblies 56. The upper and lower belts 58 and 58' respectively frictionally engage and are driven (in the direction of arrow 59 of FIGS. 6 and 7) by upper and lower discs 41 and 42, for the purpose subsequently described.

Figure 11:
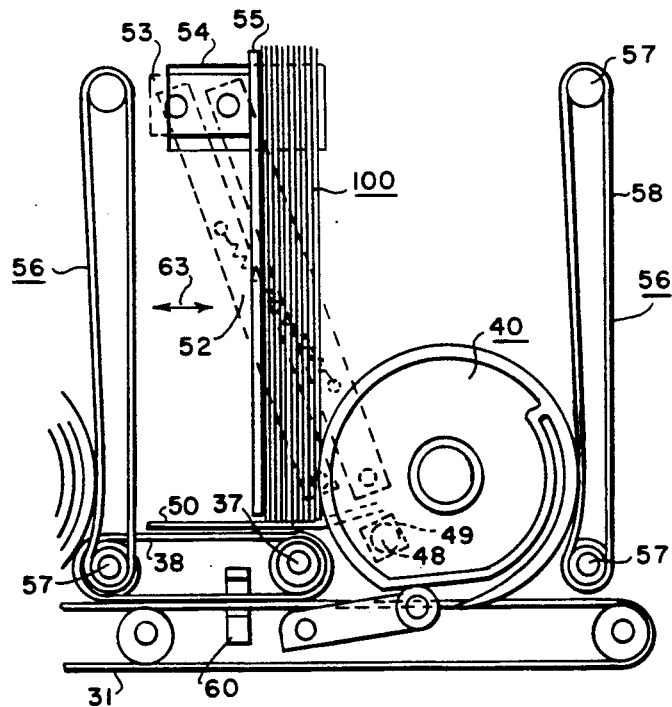
FIG. 11 is a top view, partially schematic, illustrating the expandable nature of the stacking pocket.

In accordance with a unique feature of the assembly, the document backing plate 55 is mounted by way of assembly 52 which enables the backing plate 55 to horizontally translate, as shown by arrow 63 in FIG. 11, as the documents fill the respective pocket. A limit switch (not shown) is positioned to be engaged by the backing plate tab 53 translatable within the slot 54 to indicate a pocket full condition and, by way of the electronic circuitry, either de-actuate the stacker mechanism discontinue feeding documents into that particular pocket until the pocket is emptied.

As will subsequently be described in greater detail, the control circuitry is effective to either rotate the disc assembly, or maintain it in its stationary "home" position, depending upon which bin or pocket the particular document is to be stacked. Accordingly, and to assist in such purpose, a document sensor 60 is positioned slightly upstream of the entrance to each pocket to signal the presence of an approaching document. The sensor 60 may be of any type conventionally known in the art, for example an infrared beam transmitter and receiver, the interruption of the beam by the approaching document 100 appropriately signaling the control circuitry.

Figure 4:
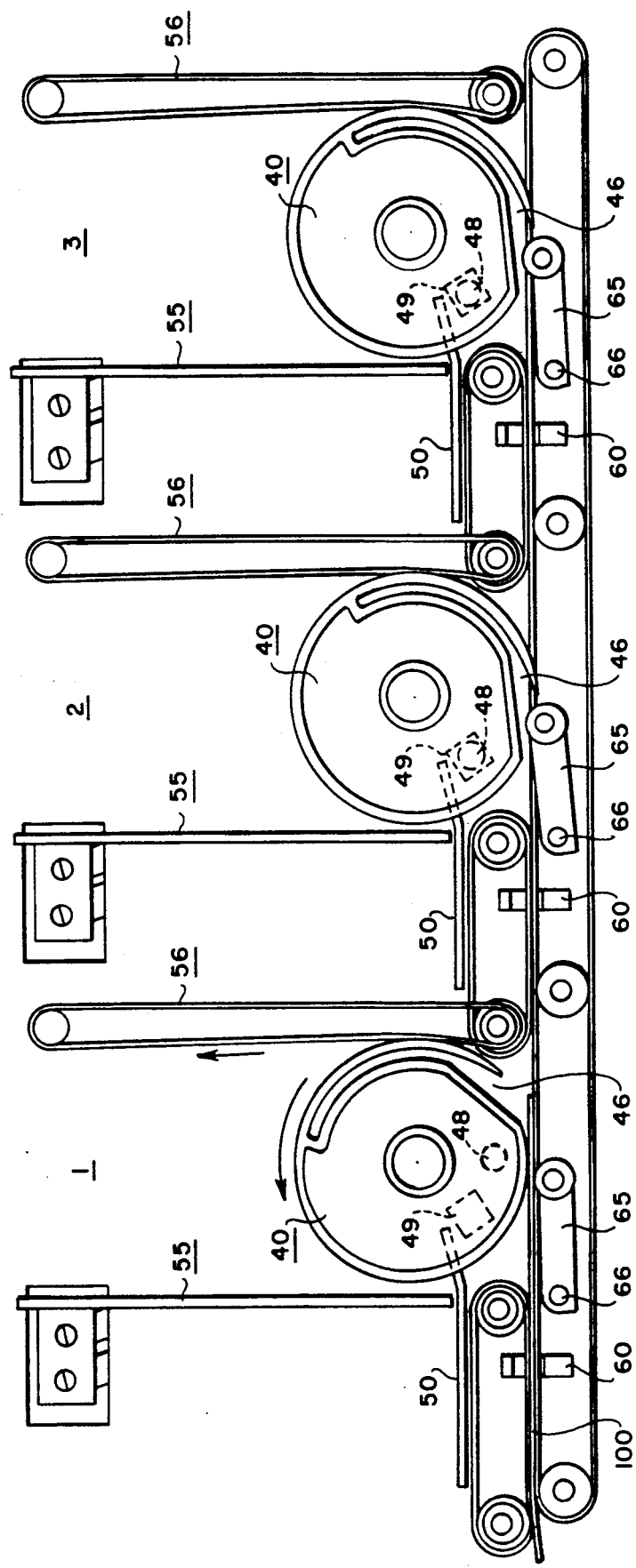
Figure 5:
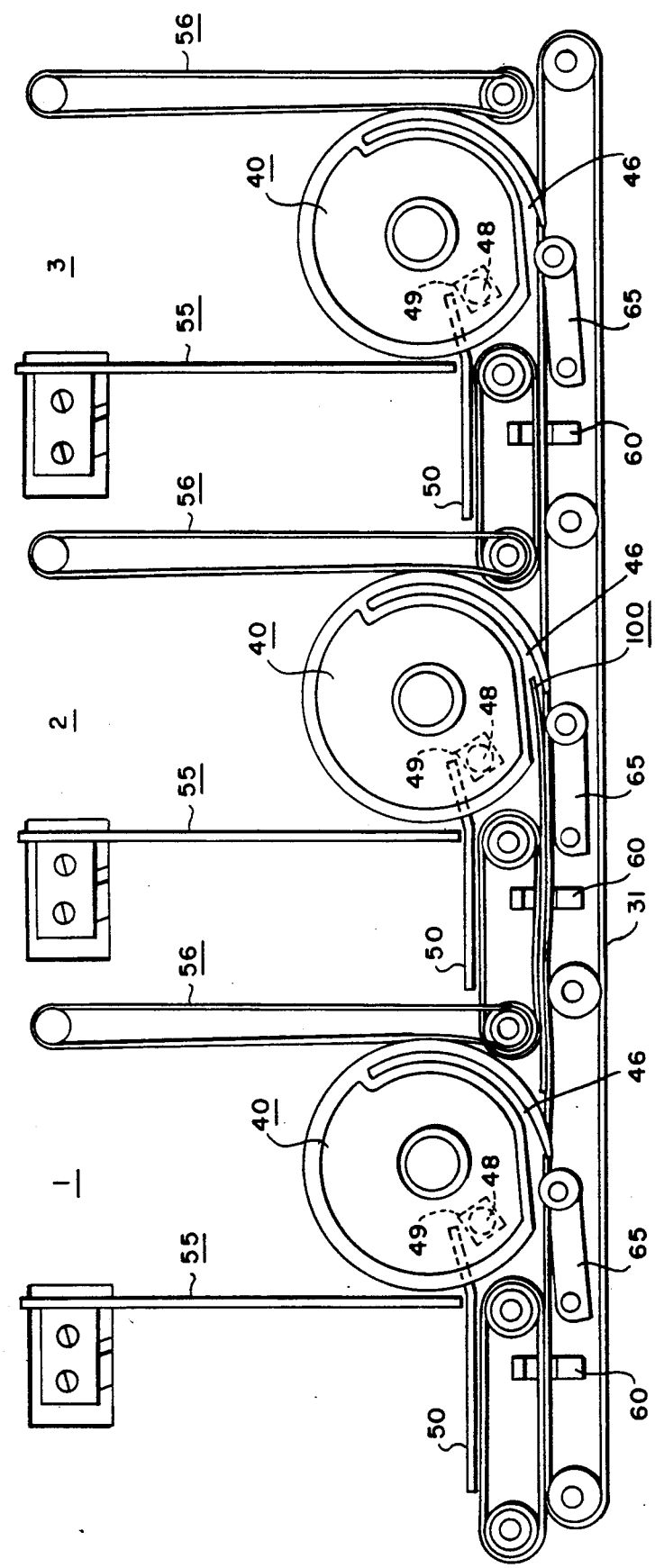

Also disposed at the entranceway to each pocket is a pivotally mounted document guide 65 (FIG. 2) pivoted on post 66, the guide being spring biased, by a torsion spring for example, to in effect act as a follower to gently guide the documents either into the open slot 46 at, or past, the particular pocket, as the case may be, as shown in FIGS. 3-5.

The various drive assemblies, motor drive electronics, power supplies, circuit boards, cooling fan assembly and other subsidiary assemblies, are conveniently located within the cabinet housing 27 below mounting plate 33.

The stacking function of the multi-pocket stacker mechanism 26 is best described with reference to FIGS. 3-7. The multi-pocket stacker mechanism 26 is under the overall control of the central processing unit, with instructions being generated as to which particular pocket is to receive a document For example, if transaction documents having one particular type of MICR data are to be stacked in a particular pocket, such type of document may be identified by the document reader, the resultant information and instruction transmitted to a microprocessor which controls the operation of the stacker motor 44.

Accordingly, assume that such a document is to be stacked in pocket 2. Under such circumstances, as the document 100 approaches pocket 1, its presence near the entrance to pocket 1 is detected by the document sensor 60, the resulting signal initially actuating the stepper motor to rotate the disc assembly 40 at pocket 1 from the home position shown in FIG. 3, counterclockwise to the position shown in FIG. 4, in which the document capture slot 46 is positioned out of the document transport path. As a consequence, the document 100 will pass pocket 1, the continued rotation of the assembly 40 assisting the transport of the document 100 towards pocket 2 as the document 100 is pinched between the circumferential surface of the discs and the transport belt.

As the document 100 passes the document sensor 60 at the entranceway to pocket 2, the leading edge of the document is positioned within the opening of the aligned capture slot 46 (FIG. 5), at which time the control circuitry actuates the stepping motor to begin rotation of the slotted disc assembly 40 at pocket 2. As a consequence of such rotation, the document is actually guided and positioned within the pocket by the rotating disc assembly (FIG. 6) until the leading edge of the so positioned document engages the document stop plate 50 (FIG. 7), at which time the continued rotation of the disc assembly toward its rotary home position results in the disc slot rotating away from the document.

Figure 7:
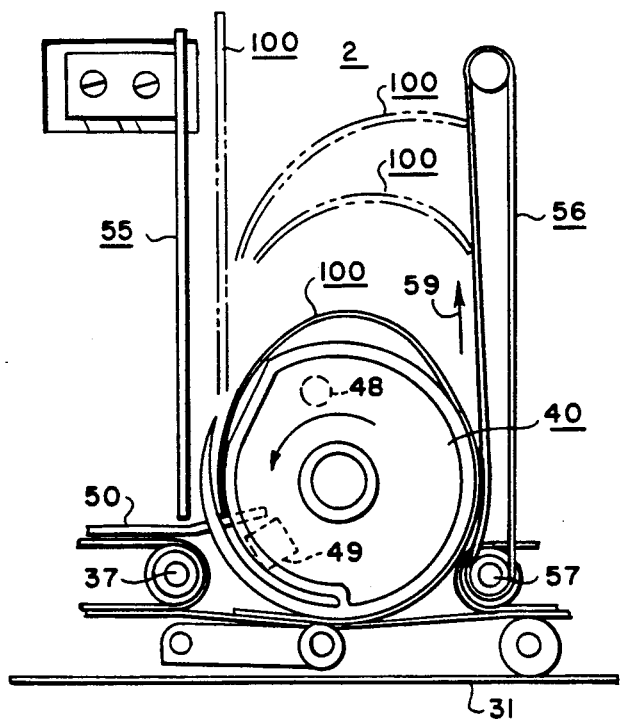

At the same time, and as a unique feature of the stacking mechanism, the tail end of the so-captured document is urged away from disk assembly 40 and toward backing plate 55 as a consequence of the rotation of the disc assembly 40 and the document tail's engagement with the clockwise moving belts 58 and 58' being driven by disc 40, all as clearly depicted in FIG. 7.

As will be noted, since the control electronics instructed the capture and stacking of the document within bin 2, the disc assembly at the entranceway to bin 3 was maintained in its stationary home position. On the other hand, if the document was to be stacked into pocket 3, the disc assemblies 40 associated with both pocket 1 and pocket 2 would have been rotated to move the slots 46 out of the document transport path.

Figure 9:
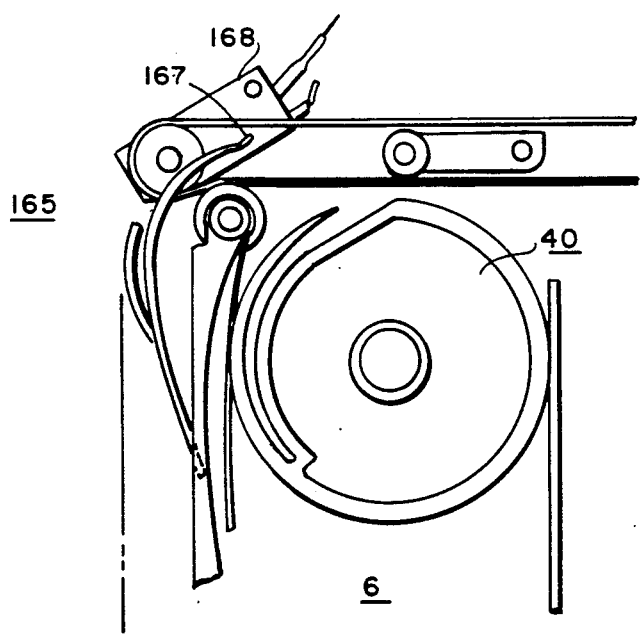
FIG. 9 is a top view, partially schematic, of a document catcher assembly of the present invention.

Disposed just beyond and downstream of the last pocket 6 is a document catcher assembly 165 (FIGS. 1 and 9) which functions to capture any documents which pass all of the preceding pockets. Accordingly, for such purpose, the assembly 165 comprises a curved spring-biased finger portion 166 having a tip 167 disposed within the transport path 30. Accordingly, documents passing bin 6 will be captured by the assembly 165, with associated sensor assembly 168 appropriately indicating the presence and extent of documents within this catcher pocket.

Figure 8:
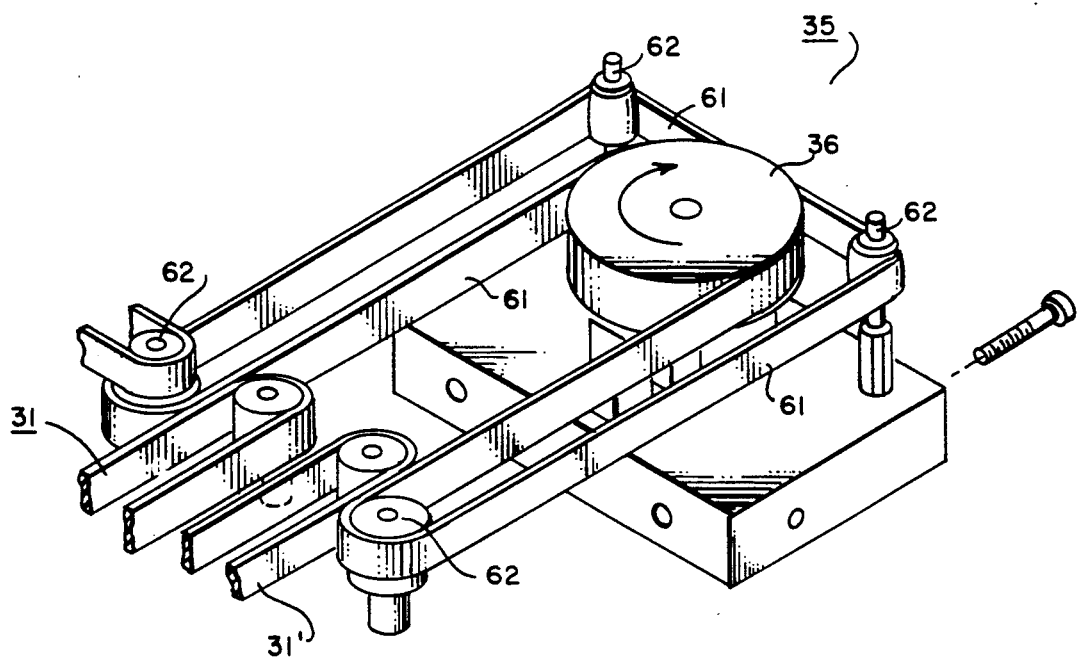
FIG. 8 is a simplified perspective illustration of the document turn assembly of the present invention.

Referring to FIG. 8, there is now depicted the document turn assembly 35. Accordingly, such assembly comprises an endless belt 61 in combination with pulley member 36 and idler rollers 62. The assembly 35 is positioned in alignment with the main transport belt assemblies 31 and 31' so that documents being transported by input transport belt assembly 31 pass into the document turn assembly 35, where they are reversed to be captured by the exit transport belt assembly 31'. In this regard, the movement of the belt 61 is synchronized with the movement of transport belt assemblies 31 and 31'.

Figure 12:
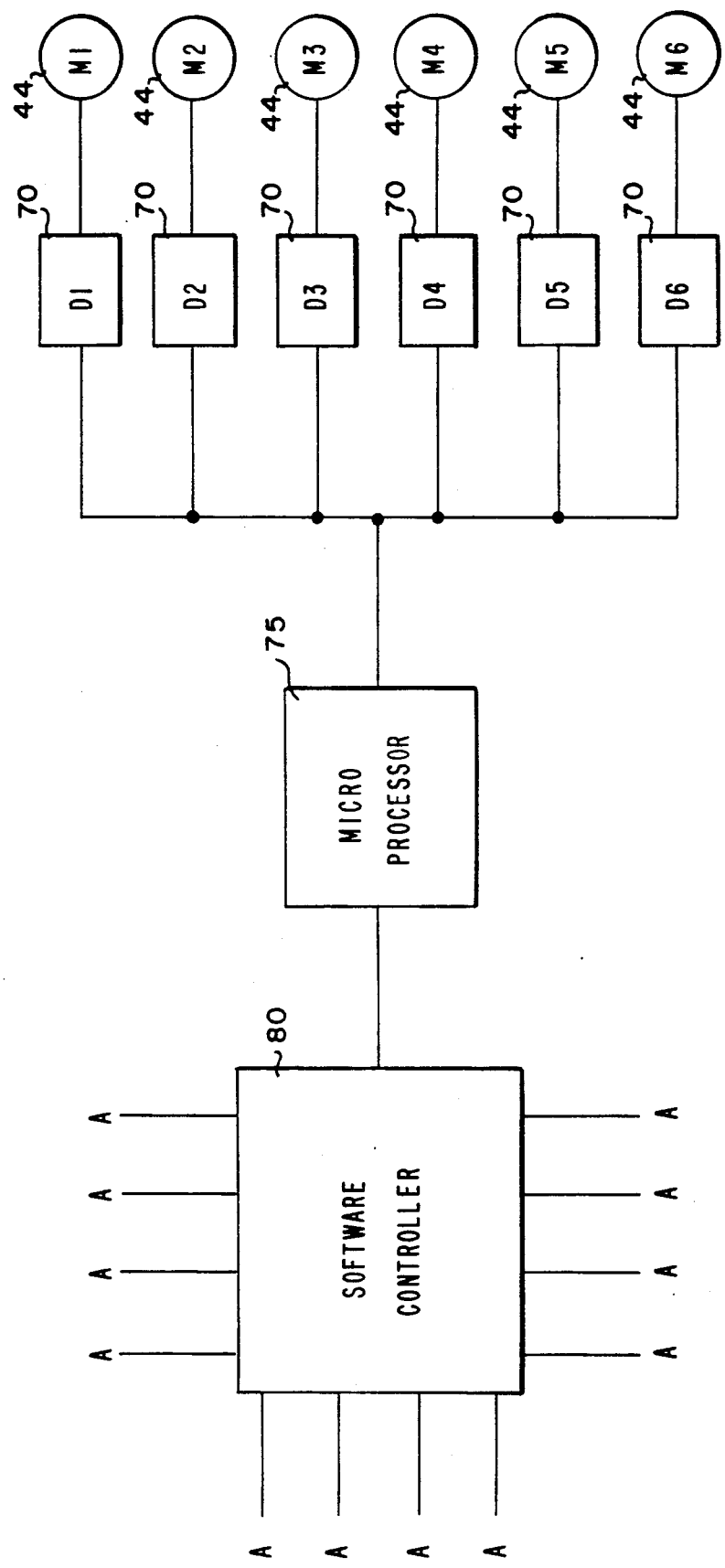
FIG. 12 is a simplified schematic illustration, in block diagram form, of the control for the sorter/stacker mechanism.

The details and operation of the overall control circuitry for effecting the stacking function is not critical to the invention and can be of any type conventionally known in the art. For example, and as schematically illustrated in FIG. 12, each stepping motor 44 associated with a respective pocket, i.e. $M_1$ for pocket 1, $M_2$ for pocket 2, etc., is coupled by way of a conventional motor drive circuit 70 to the output of a microprocessor 75. The microprocessor is in turn under the control of an appropriate software programmed controller 80 which, as a consequence, instructs the rotation of the particular drive motor, and thus the particular slotted disc assembly 40, to effect routing of the particular document in the desired bin or pocket. The software controller 80 effects the required demands in response to various information at its inputs A containing, for example, data signals from document sensors 60, home sensors 44, data read from the document reader at the document reading station 12, as well as instructions inputted by the operator through the keyboard.

It is thus observed that the stacker mechanism of the present invention achieves significantly greater system performance than prior art stackers, reduces the probability of document jams, handles a wider range of documents than normal, and enables the stacking of each of the documents with their leading edges aligned. Operator control and status monitoring of the overall stacker modules can be achieved through the operator CRT display 19 and keyboard controls.

Various modifications to the disclosed embodiment, as well as alternate embodiments, of the invention may become apparent to those skilled in the art without departing from the spirit and scope of the invention as defined by the appended claims.

What is claimed is:

1. Apparatus for sorting and stacking documents, comprising:
   means for transporting documents along a predetermined transport path;
   a plurality of pockets into which predetermined ones of said documents are respectively sorted and stacked;
   a plurality of slotted disc assemblies respectively associated with each of said pockets, each of said slotted disc assemblies having a document capture slot normally positioned in alignment with said document transport path;
   means responsive to the identification of a particular document for rotating all of said disc assemblies upstream of a selected one of said disc assemblies to position the corresponding slots thereof out of alignment with said document transport path, thereby enabling the capture of a leading end of said particular document in said capture slot of said selected one disc assembly;
   means enabling the rotation of said selected disc assembly when said leading end of said particular document is so captured to deliver the captured document into the corresponding pocket; and
   means cooperating with said selected disc assembly for urging a tail end of the particular document away from the selected disc assembly within the corresponding pocket.

2. The apparatus of claim 1 wherein said means for urging said tail end of said particular document includes an endless belt assembly associated with each of said slotted disc assemblies, each of said endless belt assemblies for cooperating with the corresponding slotted disc assembly to urge each document captured by the corresponding slotted disc assembly into the corresponding pocket and for deflecting the tail end of each of the captured documents away from the corresponding slotted disc assembly within the pocket.

3. The apparatus of claim 2 wherein each of said endless belt assemblies is driven by the rotation of the corresponding slotted disc assembly.

4. The apparatus of claim 2 wherein said document transport means includes a movable conveyor belt cooperating with said slotted disc assemblies and the corresponding endless belt assemblies for feeding said predetermined ones of said documents into the respective pockets.

5. The apparatus of claim 1 wherein each of said pockets includes a plate member for stacking documents introduced into the corresponding pocket, said plate member being translatable horizontally within the corresponding pocket to accommodate the stacked documents.

6. The apparatus of claim 1 wherein each of said pockets includes means for disengaging documents from the capture slot of the corresponding slotted disc assembly after the documents are fed into the corresponding pocket.

7. The apparatus of claim 6 wherein said means for disengaging said documents includes a document stop member for engaging the leading end of each document while the corresponding slotted disc assembly is being rotated to arrest the rotary motion of the particular document and disengage the particular document from the capture slot.

8. Apparatus for sorting and stacking documents, comprising:
   means for transporting documents along a predetermined transport path;
   a plurality of pockets into which predetermined ones of said documents are respectively sorted and stacked;
   a plurality of slotted disc assemblies respectively associated with each of said pockets, each of said slotted disc assemblies having a document capture slot adapted to be positioned into and out of alignment with said document transport path; and
   control means maintaining alignment of the corresponding slot of a selected one of said disc assemblies with said document transport path in response to the identification of a particular document for capturing a leading end of said particular document, said control means further rotating each disc assembly upstream of said selected disc assembly along the transport path in response to the identification of said particular document to position the capture slot of each upstream disc assembly out of alignment with the document transport path, the rotation of each upstream disc assembly assisting the transport of the particular document downstream along the transport path, said control means further enabling rotation of said selected disc assembly after said capturing of said leading end of said particular document to deliver said particular document into the pocket associated with said selected disc assembly.

* * * * *